United States Patent [19]

Reinhart

[11] Patent Number: 4,717,615

[45] Date of Patent: Jan. 5, 1988

[54] MULTI-LAYER FOIL AND PROCESS FOR THE PRODUCTION THEREOF

[75] Inventor: Werner Reinhart, Nuremberg, Fed. Rep. of Germany

[73] Assignee: Leonard Kurz GmbH & Co, Bavaria, Fed. Rep. of Germany

[21] Appl. No.: 888,571

[22] Filed: Jul. 21, 1986

[30] Foreign Application Priority Data

Jul. 31, 1985 [DE] Fed. Rep. of Germany ....... 3527412

[51] Int. Cl.⁴ .............................. B32B 3/00; C09J 7/02
[52] U.S. Cl. ..................................... 428/161; 428/172; 428/354; 428/916
[58] Field of Search ................ 428/161, 172, 354, 916

[56] References Cited

U.S. PATENT DOCUMENTS

| 4,381,329 | 4/1983 | Pallmann et al. | 428/204 |
| 4,455,359 | 6/1984 | Patzold et al. | 430/10 |
| 4,469,725 | 9/1984 | Fischer et al. | 428/13 |
| 4,629,647 | 12/1986 | Sander | 428/172 |
| 4,631,222 | 12/1986 | Sander | 428/172 |

FOREIGN PATENT DOCUMENTS

| 197711 | 4/1976 | Fed. Rep. of Germany | 428/172 |
| 2856279 | 2/1980 | Fed. Rep. of Germany | 428/916 |
| 2952322 | 7/1981 | Fed. Rep. of Germany | 428/916 |
| WO83/01684 | 5/1983 | PCT Int'l Appl. | 428/916 |

*Primary Examiner*—John E. Kittle
*Assistant Examiner*—Patrick J. Ryan
*Attorney, Agent, or Firm*—Louis E. Marn

[57] ABSTRACT

In a foil which has a three-dimensional patterning, the patterning effect is provided between two layers of lacquer which, by virtue of the composition thereof, cannot be readily separated from each other by chemical or physical means in order thereby to prevent the patterning from being removed for fraudulent purposes.

11 Claims, 2 Drawing Figures

MULTI-LAYER FOIL AND PROCESS FOR THE PRODUCTION THEREOF

BACKGROUND OF THE INVENTION

The invention relates generally to a multi-layer foil such as a hot embossing foil.

In an effort to improve the safeguards against forgery of documents such as check cards, credit cards, savings books and similar security documents and items, such documents may be provided with a foil such as a hot embossing foil, which has a three-dimensional patterning thereon. For example, such a patterning may be a structure which has an optical diffraction effect, such as a hologram, by means of which it is possible to produce quite definite optical effects, whether by radiation with natural light or by radiation with artificial light of a particular wavelength. In order to forge security foils of that nature, it is necessary for the forger to remove the patterning with the utmost degree of accuracy, and to transfer it on to the forged foil. However, the patterning is generally covered by a layer of lacquer to protect and safeguard it, and therefore the layer of lacquer must be removed in order to be able to take off the patterning for transfer thereof.

For example, U.S. Pat. No. 4,469,725 discloses an identity card which is formed from a laminate and which comprises two layers with different levels of optical transmission or of different colours. The adjacent surfaces of the two layers are provided with complementary and mutually interfitting impressions and raised portions respectively. In the course of manufacture, the two layers are pressed against each other, at increased temperature, whereby the layers are welded together in the interface region thereof, thus producing a unitary card. In that card, the recesses and the raised portions on the respective layers are comparatively high, corresponding to the thickness of the respective layers, more specifically being such that, when the two layers are brought together, the recesses and the raised portions engage one into the other. For the purposes of manufacture therefore, the layers are individually provided with the raised portions and the recesses respectively, and are then laid one upon the other in such a fashion that the raised portions and the recesses fit into each other. It will be appreciated that such a procedure is not possible when producing embossing foils, by virtue of the thickness thereof being small in comparison with the thicknesses of the layers of the known card. Furthermore, structures which produce an optical diffraction effect are so fine that in practice it would never be possible to provide for accurate location of two separate layers relative to each other, in such a way that surface configurations which are adapted to match to each other could be brought into interfitting relationship.

Hitherto, when producing hologram structures in embossing foils, the procedure involved was generally such that a metallised layer was produced, and the hologram or other structure producing an optical diffraction effect was then produced therein. The metal layer bearing the above-mentioned structure was then covered by a layer of protective lacquer. The lacquer used to produce the protective layer is one which on the one hand has very good adhesion to the metal layer and which on the other hand can only be dissolved away with very great difficulty, using conventional solvents. Nonetheless, persons attempting to forge such documents have repeatedly succeeded in exposing the surface of the patterning on the foil by removing the layer of lacquer.

SUMMARY OF THE INVENTION

An object of the present invention is to provide a foil such as a hot embossing foil which enjoys an enhanced degree of security in respect of forgery thereof.

Another object of the invention is to provide a multi-layer foil including a patterning effect therein, such as at least substantially to preclude exposure of said patterning.

Still another object of the present invention is to provide a hot embossing foil which while affording a high level of security in regard to alteration and forgery thereof, is still simple to produce.

Yet another object of the present invention is to provide a process for the production of a multi-layer foil which is substantially resistant to fraudulent alteration thereof.

In accordance with the present invention, these and other objects are achieved by means of a multi-layer foil, such as a hot embossing foil, comprising a backing foil and thereon a decoration layer which is provided with a three-dimensional patterning, preferably a structure which produces an optical diffraction effect. Disposed on the side of the decoration layer which is remote from the backing foil is an adhesive layer. The decoration layer comprises at least first and second successive layers of lacquer which are formed by transparent lacquers of clearly different optical properties. The interface between the first and second successive layers of lacquer forms the above-mentioned patterning and the first and second layers of lacquer cannot be separated from each other by means of chemical or physical methods.

It will be seen therefore that, in the foil in accordance with the present invention, the three-dimensional patterning is no longer disposed on a metal layer which is greatly different from the usual layers of lacquer on the foil, in regard to its structure and general properties, but instead the patterning is provided between first and second layers of lacquer which have clearly different optical properties and which preferably have greatly different refractive indices, in order thereby to make the patterning effect clearly visible. In addition, the layers of lacquer between which the patterning effect is produced are such that they cannot be separated from each other by means of chemical or physical methods. Therefore, in order to prevent the layers of lacquer from being separated by chemical means, the lacquers must be such that in principle they are of the same composition. Separation of the layers of lacquer by means of physical methods can be prevented by the layers consisting of lacquers which produce a chemical bonding therebetween, for example lacquers comprising organic groups which are not yet cross-linked or which only gradually react.

With a foil in accordance with the principles of the invention therefore, there is practically no possibility of an intending forger being able to expose in a neat and tidy fashion the interface between the two layers of lacquer, which provide the three-dimensioning patterning, thus constituting an effective safeguard against forgery by virtue of attempts at removal of the patterning effect. In other words, the patterning cannot be directly removed from the foil to which it is originally applied, for the purposes of transfer to another foil, thus providing a good safeguard against forgery.

In accordance with a preferred feature of the invention, in order to make the patterning or the structure which produces an optical diffraction effect visible to the naked eye, it may be desirable for the decoration layer which is made up of at least the first and second successive layers of lacquer to include a non-translucent layer, preferably of metal, which is arranged on the surface, which is remote from the backing foil, of the layers of lacquer which between them provide the patterning effect. By virtue of its effect of causing reflection or absorption of the incident light, the metal layer enhances the contrast effect in the region of the interface portion which carries the patterning effect, in comparison with a foil in which only the two layers of lacquer which form the patterning effect therebetween have different optical properties.

The first and second layers of lacquer making up the decoration layer with the patterning effect therebetween may consist of any suitable lacquers. However, it has been found that particularly sound adhesion in the interface region is achieved if the layers of lacquer which provide the patterning effect are formed by acrylate lacquers which can be cross-linked or cured by UV-radiation, polyurethane lacquers which can be cured or cross-linked by heat, or a mixture of such lacquers. That is because such lacquers can be gradually cured or dried, with bonding of the two layers of lacquers occurring in the interface region during the hardening process.

For the purposes of producing foils and more particularly hot embossing foils, the general practice is to apply a first layer of lacquer to the backing foil, then to apply the patterning effect to that layer of lacquer, on a metal layer disposed thereover, and finally to apply a second layer of lacquer over the metal layer. Now, in accordance with the present invention, to afford the maximum safeguard against forgery and thus to provide good adhesion between the first and second layers of lacquer which provide the patterning effect between them, the invention provides a process for the production of the foil according to the invention, which comprises applying the first layer of lacquer to the backing foil, then, before that layer of lacquer has fully dried or cured, producing the patterning effect and then applying the second layer of lacquer. The process of the invention therefore provides that the second layer of lacquer is applied before the first layer of lacquer is fully hardened or set, thereby greatly promoting the production of bonds between the two layers of lacquer so as to give particularly secure adhesion therebetween in the interface region in which the three-dimensioning patterning effect is provided.

Further objects, features and advantages of the present invention will be apparent from the following description thereof.

DESCRIPTION OF THE PREFERRED EMBODIMENTS

Figure 1:
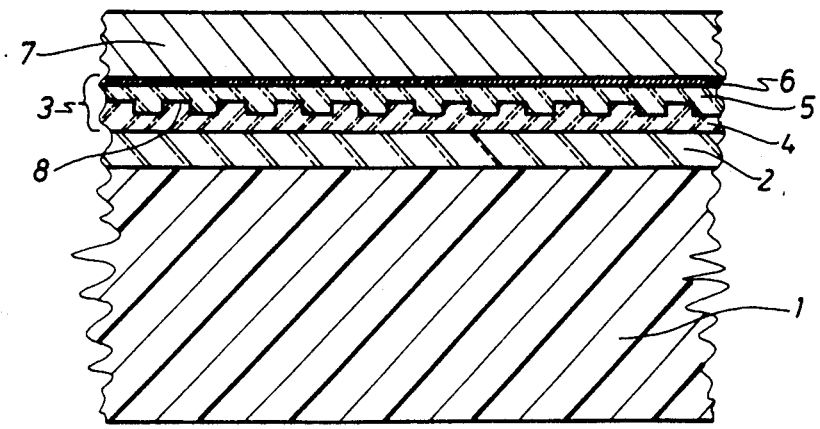
FIG. 1 is a sectional view through a part of a foil according to the invention.

Referring firstly to FIG. 1, shown therein is a foil which comprises a backing foil 1, for example a polyester foil which is about 19 $\mu$m in thickness. Disposed on the backing foil 1 on the surface thereof which faces upwardly in FIG. 1 is a release layer 2 comprising for example a wax-like layer or a layer of special lacquer. Disposed then on the layer 2 is a decoration layer which is generally identified by reference numeral 3 and which comprises a first layer of lacquer 4, a second layer of lacquer 5 and a metal layer 6. The layers 4 and 5 are each about 1–5 $\mu$m in thickness, while the metal layer 6 is applied for example by a vapor deposition process.

The layer 3 may be released from the backing foil 1 for example by the effects of heat and pressure, and in use is secured to the item or article to be decorated or protected, for example a plastic credit card, by means of an adhesive layer as indicated at 7. The adhesive layer 7 may be for example from about 0.2 to 0.7 $\mu$m in thickness. The adhesive layer 7 may be formed by any suitable material such as a hot melt adhesive or a special lacquer which becomes sticky when heated.

Referring still to FIG. 1, it will be seen therein that between the two layers of lacquer 4 and 5 is an interface region as indicated generally by 8, which is provided with a three-dimensional patterning thereat. The patterning is shown in diagrammatic form only. The patterning in the interface region 8 is for example a structure which has an optical diffraction effect, more particularly for example a hologram.

In order for the patterning effect or optical-diffraction structure at the interface region 8 to be visible, the lacquers 4 and 5 making up the layer 3 are transparent. On the other hand, they have clearly different optical properties from each other, for example they have greatly different refractive indices.

The patterning effect at the interface region 8 is produced in a manner which is known per se from the manufacture of embossing foils, for example by means of a rolling process or by means of a process which involves a linear stroke motion.

The foil according to the invention may be produced in two different ways, either by what is referred to as a dry texturing process or by what is referred to as a wet texturing process.

In the dry texturing process, a lacquer is applied to the backing foil 1 and at least substantially dried. The patterning effect is then produced in that first layer of lacquer, by a rolling process or a stroke motion process as referred to above. The second layer of lacquer is then applied thereto.

When the foil is produced using the dry texturing process, the first layer of lacquer applied to the backing foil may consist of a lacquer of the following composition, being applied over the entire surface of the backing foil with a weight in relation to surface area of from 2.5 to 3.0 g/m$^2$:

| Composition | Lacquer A Parts by wt | Designation | manufacturer |
|---|---|---|---|
| Aliphatic trifunctional acrylic ester | 1000 | SR 444 | (Sartomer) |
| Reactant diluent | 200 | SR 285 | (Sartomer) |
| Silicone-modified polyester resin | 300 | Silico ftal HTL | (Goldschmidt) |
| Hydroxyl group-bearing acrylic resin | 1500 | G-Cure 867 | (Henkel) |
| Photoinitiator | 100 | Dorocur 1664 | (Merck) |
| Aromatic polyfunctional isocyanate component | 1400 | Desmodur IL | (Bayer) |

-continued

| Lacquer A | | | |
|---|---|---|---|
| Composition | Parts by wt | Designation | manufacturer |
| Toluene | 2000 | | |
| Methyl ethyl ketone | 500 | | |

When the texturing effect is produced in the layer of lacquer formed from above-defined lacquer A, using the linear stroke process referred to above, operation is effected for example using a pressure in relation to surface area of 1 tonne/cm², a temperature of around 110° C. and a pressure-application period of 0.4 second. If a rolling-type process as referred to above is used for producing the texturing or patterning effect, operation may be with a line pressure of around 150 kp/cm, a temperature of around 110° C. and a speed of movement of the roller or the foil with the lacquer of 15 meters/minute.

The second layer of lacquer is also applied over the entire surface, with a weight in relation to surface area of from 1.0 to 1.5 g/m². For that operation, for example a lacquer of the following composition may be used:

| Lacquer B | | | |
|---|---|---|---|
| Composition | Parts by wt | Designation | (Manufacturer) |
| Hydroxyl group-bearing aliphatic pentafunctional acrylic ester | 1000 | SR 399 | (Sartomer) |
| Aliphatic polyester urethane acrylate | 1000 | Genomer T1200 | (Rahn) |
| Photoinitiator | 800 | Irgacune 651 | (Ciba) |
| Methyl ethyl ketone | 1500 | | |

The bonding effect between the layers consisting of the applied lacquers A and B occurs by virtue of crosslinking between the constituent of the two layers of lacquer, which constituents are not completely cured, subsequent to the application of the second layer of lacquer, thereby producing a bond between the layers of lacquer in the interface region 8, which in practical terms is inseparable.

Figure 2:
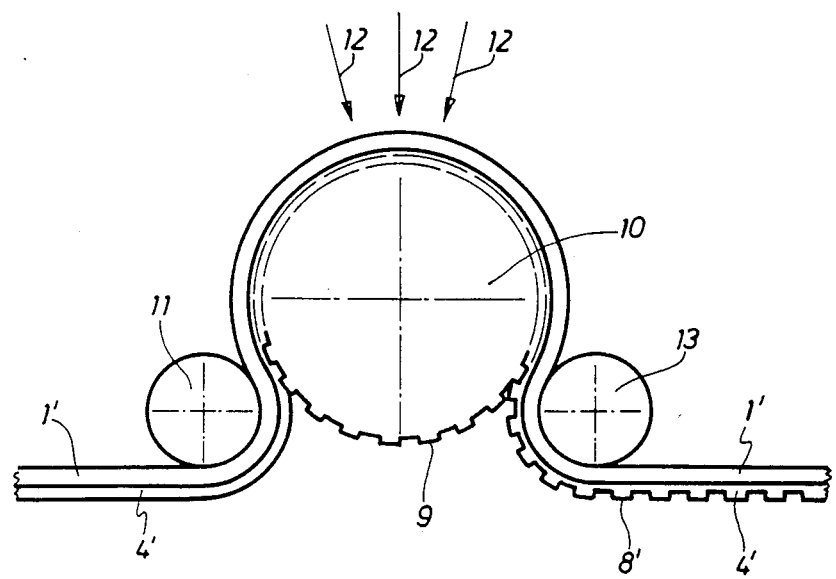
FIG. 2 is a diagrammatic view of a part of an apparatus for producing a foil according to the invention.

If it is found that there is a wish or a need to operate at a higher rate in manufacture of the foil, then the above-mentioned wet texturing process may be used instead. In that connection, reference may be made to FIG. 2 which shows in diagrammatic form the step of applying the first layer of lacquer to the backing foil. As shown in FIG. 2, the first layer of lacquer as identified at 4' and possibly the release layer 2 (not actually shown in FIG. 2) are applied to the backing foil 1' in known manner, for example by an itaglio-type printing process. The backing foil 1' with the first layer of lacquer 4' thereon then passes over the peripheral surface of a cooled roller 10 which rotates with the foil as it passes over the surface thereof. The peripheral surface of the roller 10 bears the three-dimensioning patterning as indicated at 9. The foil is passed over the roller 10 in such a way that the first layer of lacquer 4' faces towards the patterned surface 9 of the roller 10 and is thus provided with the texturing effect as it passes around the roller 10, thereby producing the configuration of the interface region 8'.

It will be seen from FIG. 2 that the backing foil 1' with the layer of lacquer 4' thereon is pressed against the textured-surface roller 10 by means of a roller 11, for example of rubber.

While the backing foil 1' with the layer of lacquer 4' thereon passes on around the roller 10, the foil is subjected to UV-irradiation, as indicated by the arrows 12 in FIG. 2, more particularly from the back of the backing foil 1', that is to say, from the side thereof remote from the side to which the layer of lacquer 4' has been applied. That means that the UV-radiation is suitably attenuated in the backing foil 1' before it reaches the layer of lacquer 4'. If the backing foil 1' comprises polyester material, it can generally be assumed that only radiation of a wavelength of more than 360 nm is transmitted through the backing foil 1' to the layer of lacquer 4', so that the lacquer 4', being of a composition which can be caused to cure by the UV-radiation, is only partially set.

The backing foil 1' with the layer of lacquer 4' thereon then passes around a release roller 13 which is disposed at the downstream side of the roller 10, whereby the backing foil 1' with the layer of lacquer 4' thereon is released from the surface of the roller 10.

The partially completed foil 1' and 4' leaving the roller 10 in FIG. 2 is then subjected to a step in which a further layer of a hardenable lacquer is applied to the layer of lacquer 4' as by an intaglio-type printing process. The two layers of lacquer are then subjected to definitive curing, depending on the composition thereof, either by virtue of being subjected to the effects of heat or by virtue of further UV-irradiation.

The following lacquers may be used for carrying out the wet texturing process described above:

The first layer of lacquer 4' may be a lacquer C, which is applied to the backing foil over the entire surface thereof with a weight in relation to surface area of from 1.5 to 2.0 g/m²:

| Lacquer C | | | |
|---|---|---|---|
| Composition | Parts by wt | Designation | (Manufacturer) |
| Aliphatic silicone-modified acrylic ester | 1000 | Silicon-acrylat VP 6536 | (Rohm) |
| Hydroxyl group-bearing aliphatic pentafunctional acrylic ester | 1000 | SR 399 | (Sartomer) |
| Aliphatic polyester urethane acrylate | 1000 | Genomer D 900 | (Rahn) |
| Photoinitiator | 80 | Dorocur 1664 | (Merck) |
| Methyl ethyl ketone | 1500 | | |

The second layer of lacquer, which is applied to the textured surface of the layer 4' in FIG. 2, consists of a lacquer D which is also applied over the entire surface thereof as for example by an intaglio-type printing process, with a weight in relation to surface area of from 1.0 to 1.5 g/m².

| Lacquer D | | | |
|---|---|---|---|
| Composition | Parts by wt | Designation | (Manufacturer) |
| Aliphatic trifunctional acrylic ester | 1000 | SR 444 | (Sartomer) |
| Reactant diluent | 2000 | SR 385 | (Sartomer) |
| Aliphatic polyester urethane acrylate | 1000 | Genomer D 900 | (Rahn) |
| Aliphatic polyester acrylate | 1000 | Prepoliner VSP 2051 | (Degussa) |

-continued

Lacquer D

| Composition | Parts by wt | Designation | (Manufacturer) |
|---|---|---|---|
| Copolymerising tertiary amine | 600 | Uvecryl P 101 | (UCB) |
| Photoinitiator | 400 | Irgancune 651 | (Ciba) |
| Methyl ethyl ketone | 1000 | | |

Instead of using above-defined lacquers B and D which can each be caused to set by means of UV-irradiation, it would also be possible to use the following lacquer E, a cross-linking polyurethane lacquer:

Lacquer E

| Composition | Parts by wt | Designation | (Manufacturer) |
|---|---|---|---|
| Low-viscosity nitrocellulose | 600 | Collodium-Wolle E330 | (Wolff) |
| High-molecular polymethyl-methacrylic resin | 600 | Plexigum M 527 | (Rohm) |
| Silicone-modified polyester resin | 150 | Silicoftal HTL | (Goldschmidt) |
| Hydroxyl group-bearing polymethylmethacrylic resin | 600 | Degalan LS 150/300 | (Degussa) |
| Aromatic polyfunctional isocyanate component | 1400 | Desmodur IL | (Bayer) |
| Ethyl acetate | 2000 | | |
| Methyl ethyl ketone | 2400 | | |
| Cyclohexanone | 600 | | |

When using above-defined lacquer E, the process must involve a thermally induced hardening operation, for example in a drying cabinet, at a temperature of from about 70° to 80° C. over a period of 12 hours.

When the two layers of lacquer 4 and 5 have been applied to the backing foil 1, then the metal layer 6 may thus optionally also be applied, for example by a vapor deposition process or alternatively by sputtering. It would also be possible to use colored layers of lacquer and the like.

The foil is then finished off by optionally applying the adhesive layer 7 shown in FIG. 1.

It will be appreciated that the foregoing description of the present invention has been set forth solely by way of example thereof and that various modifications in the compositions of materials used and the operating procedures involved may be made therein without thereby departing from the spirit and scope of the invention.

I claim:

1. A multi-layer foil comprising a backing foil having first and second surfaces, said first surface of said backing foil being provided with a three-dimensional patterning layer, said patterning layer being comprised of at least first and second successive layers formed of transparent lacquers of different optical properties thereby forming said patterning at an interface region thereof, said first and second layers when formed being transparent lacquers including organic groups which are not yet crosslinked and upon curing are bonded thereby inseparable from each other by means of chemical and physical methods.

2. The foil as set forth in claim 1 and further including an adhesive layer on a side of said patterning layer remote from said backing foil.

3. The foil as set forth in claim 1 wherein said optical properties are respective refractive indices of each layer.

4. The foil as set forth in claim 1 wherein said multi-layer foil further includes a non-translucent layer on a surface of said patterning layer remote from said backing foil.

5. The foil as set forth in claim 4 wherein said further layer is a metal.

6. The foil as set forth in claim 1 wherein said first and second successive layers comprise an acrylate lacquer adapted to be cured by UV-radiation.

7. The foil as set forth in claim 1 wherein said first and second successive layers comprise a polyurethane lacquer adapted to be cured by heat.

8. The foil as set forth in claim 1 wherein said first and second successive layers comprise a mixture of acrylate lacquer adapted to be cured by UV-radiation and polyurethane lacquer adapted to be cured by heat.

9. The foil as set forth in claim 1 which is a hot embossing foil.

10. A process for production of a multi-layer foil as set forth in claim 1 comprising:
applying a first layer of lacquer to said backing foil;
prior to complete hardening of said first layer of lacquer, producing said patterning on said first layer of lacquer; and
applying said second layer of lacquer to said patterned first layer of lacquer.

11. In a process for the production of a multi-layer foil comprising a backing foil and thereon a decoration layer comprising at least first and second successive layers which are formed by transparent lacquers of substantially different optical properties whereat an interface region provides a three-dimensional patterning and which are inseparable from each other by means of chemical and physical methods, the process including applying said first layer of lacquer to said backing foil, imparting said three-dimensional patterning to said applied first layer of lacquer and then applying said second layer of lacquer to said patterned first layer of lacquer, the improvement which comprises patterning said first layer of lacquer prior to setting thereof and thereafter applying said second layer of lacquer.

* * * * *